United States Patent [19]
Kocznar et al.

[11] Patent Number: 5,825,393
[45] Date of Patent: Oct. 20, 1998

[54] APPARATUS FOR READING AND IDENTIFYING DATA CARRIERS IN CARD FORM WHICH CAN BE PRINTED UPON

[75] Inventors: Wofram Kocznar, Innsbruck; Harald Miesbauer, Scharnstein, both of Austria

[73] Assignee: Skidata Computer Gesellschaft m.b.H., Gartenau, Austria

[21] Appl. No.: 632,505

[22] PCT Filed: Oct. 17, 1994

[86] PCT No.: PCT/AT94/00150

§ 371 Date: Apr. 19, 1996

§ 102(e) Date: Apr. 19, 1996

[87] PCT Pub. No.: WO95/11493

PCT Pub. Date: Apr. 27, 1995

[30] Foreign Application Priority Data

Oct. 19, 1993 [AT] Austria .................................. 2098/93

[51] Int. Cl.⁶ .......................................................... B41J 2/32
[52] U.S. Cl. ............................................ 347/171; 347/220
[58] Field of Search ...................................... 347/221, 220, 347/171; 400/120.01

[56] References Cited

FOREIGN PATENT DOCUMENTS

| 0437724 | 7/1991 | European Pat. Off. . |
| 0199234 | 7/1992 | European Pat. Off. . |
| 3704059 | 8/1988 | Germany . |
| 8804458 | 6/1988 | WIPO . |
| 9221105 | 11/1992 | WIPO . |

Primary Examiner—Huan H. Tran
Attorney, Agent, or Firm—Lorusso & Loud

[57] ABSTRACT

To print a card-type data medium that has a thermosensitive layer, the data medium is passed through a flat channel defining a level transport path provided with a bulge. Situated in the bulge is a thermal print head set at a distance outside the transport path. Opposite the thermal print head, on the other side of the channel is a pressure contact roller which can be moved through the transport path toward the thermal print head. The device preferably has a bar code reader, a magnetic strip reader and an IC reader.

18 Claims, 2 Drawing Sheets

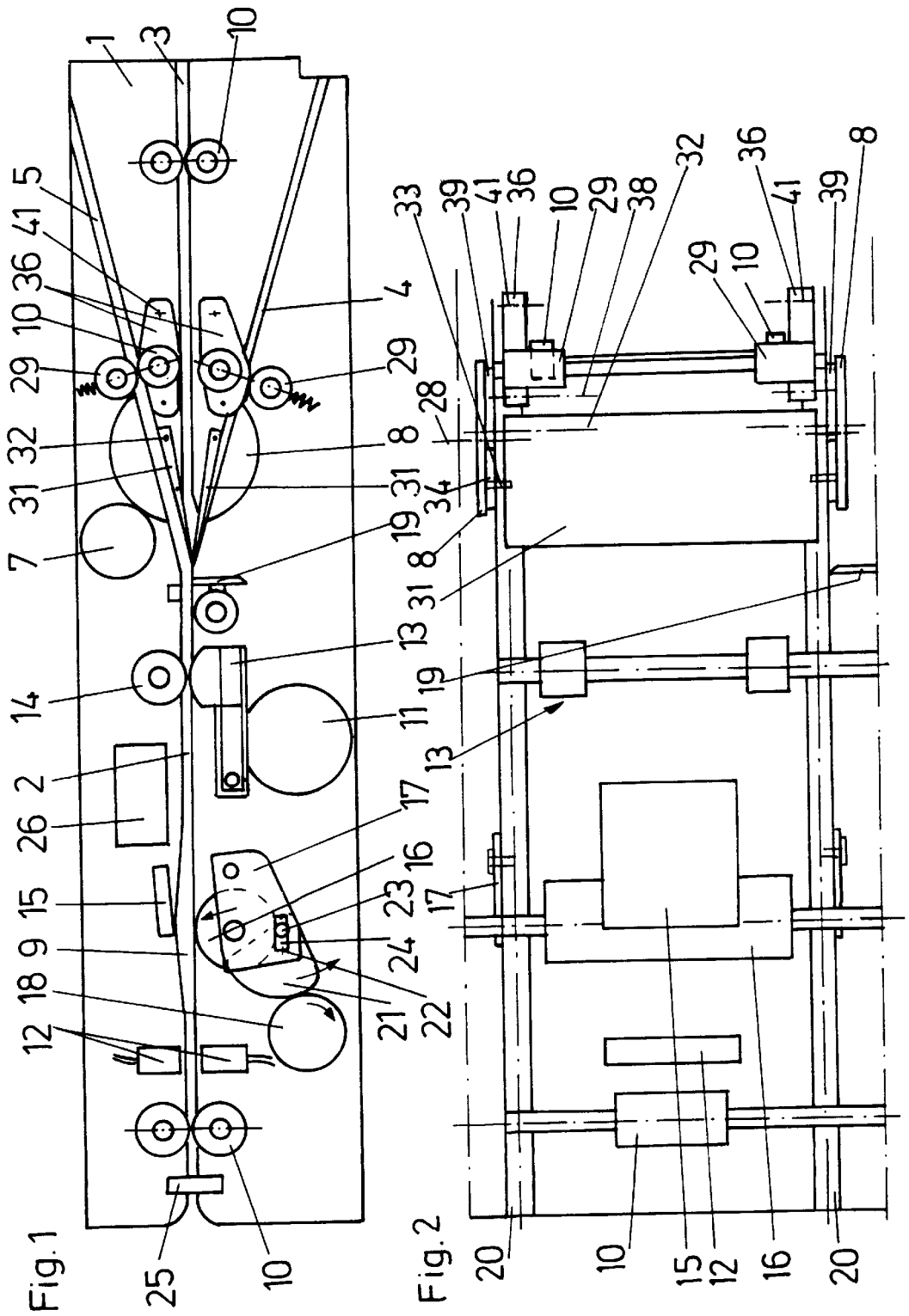

APPARATUS FOR READING AND IDENTIFYING DATA CARRIERS IN CARD FORM WHICH CAN BE PRINTED UPON

BACKGROUND OF THE INVENTION

1. Field of the Invention

The invention concerns an apparatus for reading and identifying data carriers in card form which can be printed upon and which have a thermosensitive layer, comprising a transport mechanism for linear movement of the data carrier in a shallow passage defining a transport path, a reading-identification means having a thermal printing head for visually readable identification of the data carrier, and a pressure roller which is disposed opposite the thermal printing head.

2. Description of the Prior Art

Apparatuses of that kind are known for example from EP-B-199 234 in accordance with which the thermal printing head is arranged rigidly at the transport path and the oppositely disposed pressure roller is resiliently movably suspended. WO-88/04458 discloses an apparatus which has an angled guide path and a thermal printing head arranged in the bend region, wherein the data carrier must be bent over both in the forward movement and also in the return movement.

A further apparatus of this kind is disclosed in EP-A-437 724 which again has a straight guide path into which the thermal printing head can be pivoted. In both the last constructions the oppositely disposed pressure roller is arranged rigidly.

For operation of the thermal printing head, the data carrier is to be slightly curved at least in the region of contact so that the thermal printing head can bear approximately tangentially thereagainst. If the curvature of the data carrier is to be produced by the angled configuration of the guide path or by the fact that the thermal printing head and the pressure roller are pressed against each other, the data carrier must be slightly bendable and must be of small thickness.

Data carriers in card form generally have not only the region which can be printed upon by virtue of the action of heat, but in addition, in accordance with the two above-mentioned EP-specifications, they may also have a magnetic strip and/or include an electronic module (WO-92/21105) which for example can be used as check or telephone cards, ski passes etc and which are of greater thickness and increased bending stiffness.

SUMMARY OF THE INVENTION

Now, the object of the present invention is to provide a card checking and processing apparatus of the kind set forth in the opening part of this specification, into which data carriers in card form of any thickness can be inserted.

In accordance with the invention that object is attained in that the thermal printing head is arranged outside the transport path and the oppositely disposed pressure roller is arranged movably towards the thermal printing head. This permits processing of all kinds of data carriers in card form, as they are preferably moved along a flat transport path. If the data carrier is to be processed by means of the thermal printing head the pressure roller is actuated to press the data carrier against the thermal printing head. Preferably the thermal printing head is disposed in a bulge or concave portion of the passage so that the data carrier is slightly curved. The arrangement outside the transport path prevents unnecessary soiling and wear of the thermal printing head which, as the pressure roller is in any case moved, is arranged fixedly or limitedly yieldingly in the bulge portion.

DESCRIPTION OF THE PREFERRED EMBODIMENTS

A first preferred embodiment provides that the reading-identification means has a bar code reader and a magnetic strip reader and/or readers for an in particular re-writable electronic module (IC) so that data carriers with a bar code, with a magnetic strip and/or with an electronic module can be read by machine and if necessary can also be subjected to thermal processing if for example the memory content or the changes therein are to be made visually readable or a bar code is to be applied. A data carrier which is only to be checked runs freely through in the flat transport path. After checking return thereof or however also discharge thereof at the other end is possible.

For the movement of the pressure roller, it is preferably provided that the pressure roller is mounted on a rocker member which can be raised by means of an eccentric element. The stroke movement of the pressure roller in that case can be restricted by virtue of the fact that the eccentric element has an entrainment roller arranged on a pivotably driven crank arm and the entrainment roller engages into a slot in the rocker member.

The possible uses of the apparatus can be further enhanced if the transport path forks adjoining the reading-identification means and a routing device which can be switched over is provided in a side section. That makes it possible for example to deal with two data carriers, for example a value and a credit or check card: for the first-mentioned value card for example a price or the like to be printed thereon can be fixed, by suitable items of information being provided by one of the reading devices. The data carrier is then moved by way of the routing device into the side section which serves as a park path whereupon the credit card, as the second data carrier, is inserted, subjected to processing and discharged again. That usually does not require any printing operation. After the credit card has been discharged again, the value card which was first inserted is recovered from the park path, printed upon by means of the thermal printing head, and also discharged again. The switchable routing device preferably has a pivotably mounted routing flap and is moved by means of a driven control disk on which a cam track is provided. So that a data carrier which is deposited in the side section does not change in position, a preferred construction provides that a clamping device is provided in the branching-off side section of the transport path. The clamping device is preferably also actuated by way of the control disk, for which purpose a second cam track can be provided on the control disk. It will be appreciated that instead of the cam track it is also possible to provide other drive means for the routing flap and/or the clamping device, for example electromagnetic drive means which can also be used individually and independently of each other.

A further preferred construction can provide that two side sections branch off the transport path, each of the two side sections having a routing flap and a clamping device. That makes it possible for a strip which is first to be cut to length in the apparatus to be supplied from a supply roll by way of one of the two side sections so that the apparatus can also be used for issuing data carriers with use-specific printing thereon, for example travel cards and season tickets, without impeding the other options described.

Particularly in this construction the cam control system is of particular advantage as a particularly simple structure is afforded when the two routing flaps and the two clamping devices have associated therewith a common rotatably driven control disk on which are provided a common cam track for the two routing flaps and a second common cam track for the two pivot levers of the clamping devices.

BRIEF DESCRIPTION OF THE DRAWING

The invention will now be described in greater detail with reference to the Figures of the accompanying drawing without being restricted thereto. In the drawing:

FIG. 1 is a diagrammatic view in longitudinal section through an embodiment of an apparatus according to the invention, FIG. 2 is a diagrammatic plan view of parts of the apparatus.

Figure 3:
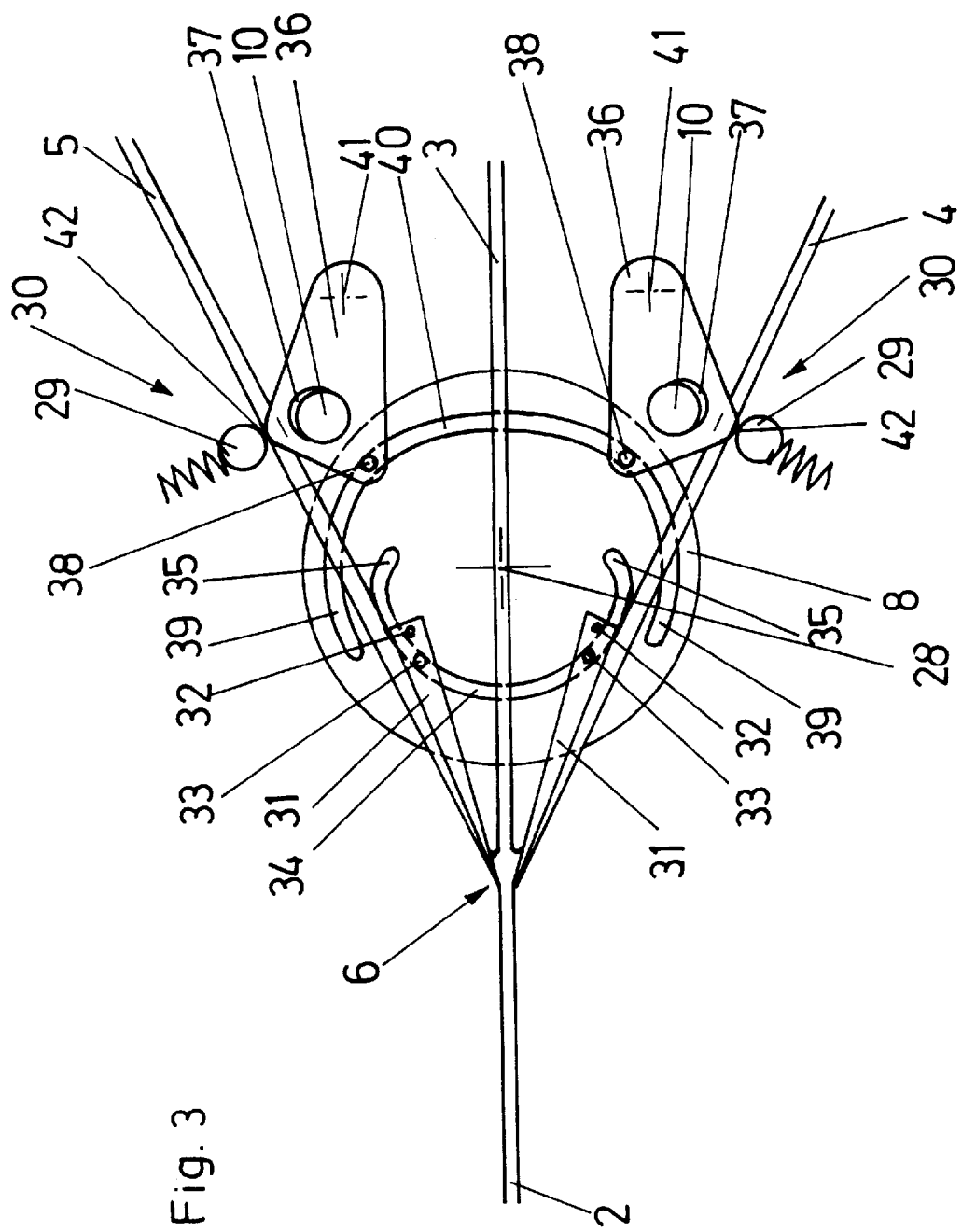
FIG. 3 shows the routing and clamping mechanism on an enlarged scale.

Extending in a housing 1 is a flat passage 2 which is defined by two lateral U-shaped rails 20 and with which are associated rollers 10 for transporting a data carrier in card form through the passage 2, the rollers being mounted rigidly or elastically and some being driven by a motor 11 and others not being driven. Disposed along the passage 2 which defines a flat transport path are a plurality of light barrier means 25, of which only one is indicated, for determining the respective position of a data carrier. A reading-identification means for all known kinds of data carriers in card form includes at each flat side of the passage a central bar code reader 12, a thermal printing head 15 with an oppositely disposed pressure roller 16, at least one magnetic read-write head 13 which is arranged at the outside, with an oppositely disposed pressure roller 14, and an IC-reader 26 for contact-less communication with an electronic module which is embedded in particular in the interior of the data carrier.

Between the bar code reader 12 and the magnetic strip reader 13 the passage 2 is provided with a bulge or concave portion 9 in which the thermal printing head 15 is arranged, outside the transport path. Accordingly data carriers passing through the passage 2 do not come into contact with the thermal printing head 15. If printing is to be applied to a data carrier having a thermosensitive region, the pressure roller 16 is raised so that the data carrier is curved and finally printed upon. Accordingly curving of the data carrier is effected only at the respectively required time and to that extent which results in the best possible printing on the data carrier. The pressure roller 16 is moved to a much greater degree than in known apparatuses as the gap to be overcome is wider than the greatest thickness of the data carriers to be passed therethrough. The contact region of the pressure roller is therefore moved from a position outside the transport path substantially through same to the other side of the transport path and the gap is reduced to the desired width.

The thermal printing head 15 can be arranged fixedly in the bulge or concave portion 9 and the pressure roller 16 can be arranged to be slightly yielding.

Preferably the arrangement involves the stroke limitation shown in FIG. 1, in which case the driven pressure roller 16 is mounted on a rocker member 17 in which there is provided a slot 24 which is approximately parallel to the transport path. A toothed segment 21 which is driven by a motor 17 pivotably about the axis 22 carries an entrainment roller 23 which engages into the slot 24. When the toothed segment 21 is pivoted in the direction illustrated, the entrainment roller 23 moves upwardly in a circular arc, which provides for a maximum stroke movement on the part of the pressure roller 16. In that case preferably the thermal printing head 16 is disposed to be slightly yielding in the bulge or concave portion 9 so that the return spring (not shown) thereof determines the contact pressure against the upwardly curved data carrier.

Subsequently to the reading-identification means the transport path forks into a rectilinear continuation 3 and two side sections 4, 5 which lead inclinedly downwardly and upwardly respectively. Provided at the fork is a switchable routing device 6 which is switchable from its central position in which it is disposed in the transport path 2, 3 to the lower or the upper side section 4, 5 by an electric motor 7. At least the continuation 3 of the transport path and a side section 4 are open at one end so that the data carriers can not only be moved to and fro but can also be transported from both sides through the apparatus. In front of the routing device 6, associated with the passage 2 is a cutting device 19, by means of which data carriers can be cut off a supply roll, the data carriers being supplied for example through the side section 4. The side section 5 is intended in particular as a parking path for a data carrier if in the meantime a second data carrier is to be processed in the apparatus. Associated with both side sections 4, 5 is a clamping device 30 which is operative when the routing device 6 is closed.

A device which has a control disk 8 driven by a motor 7 is provided for switching the routing device 6 from the central position shown in FIG. 3 into the position shown in FIG. 1 which connects the upper side section 5 to the transport path. Provided on the control disk 8 is a first cam track 34 for moving two routing flaps 31 and a second cam track 39 for moving two pivot levers 36. The routing flaps 31 are each mounted pivotably about a respective axis 32 and are guided with a pin 33 in the cam track 34 which extends in a circular arc concentrically with respect to the axis 28 of the control disk 8 over a central angular range of for example 160° and which in the two end regions 35 approaches the axis 28 for example over an angle of about 20°. At the beginning of the rotary movement of the control disk 8 each routing flap 31 therefore does not change from the central position shown in FIG. 3 in which it is lowered into the initial region of the respective side section 4, 5, but it pivots on to the respective other side of the transport path as soon as the pin 33 passes into the end region 35.

A similar movement is performed by the pivot levers 36 which are pivotable about the axis 41 and have a pin 38 engaging into the second cam track 39. The latter extends in a central region 40 closer to the axis 28 of the control disk 8 than in the two end regions in which each pivot lever 36 is urged outwardly. Each pivot lever 36 has a slot 37 through which the shaft of the driven transport rollers 10 passes so that movement of the pivot lever outwardly is possible. The undriven transport roller 29 which as shown at the top in FIG. 1 is urged resiliently towards the transport roller 10 is urged outwardly by the pivot lever 36 which is provided with a clamping region 42, in which case the pivot lever 36 lifts a data carrier disposed between the transport rollers 10, 29 outwardly off the driven transport roller 10 which thereby runs idly, and clamps it fast between the clamping region 42 which projects beyond the roller 10, and the outwardly urged transport roller 29 (bottom part of FIG. 1). That position occurs whenever the side section 4, 5 is closed, that is to say the routing flap 31 closes off the entrance (bottom of FIG. 1 and top and bottom of FIG. 3).

We claim:

1. Apparatus for reading and identifying data carriers in card form which can be printed upon and which have a thermosensitive layer, comprising;

a transport mechanism for linear movement of the data carriers in a shallow passage defining a transport path, a reading-identification means having a thermal printing head for recording visually readable identification of the data carriers, said thermal printing head being arranged so far outside the transport path that data carriers which are not to be thermally printed upon and which pass the thermal printing head do not touch same, and a pressure roller being disposed opposite the thermal printing head and movably towards the thermal printing head.

2. Apparatus according to claim 1 characterized in that the thermal printing head is arranged in a bulge portion of the shallow passage.

3. Apparatus according to claim 1 characterized in that the reading-identification means has a bar code reader and a magnetic strip reader, said thermal printing head being arranged between the bar code reader and the magnetic strip reader.

4. Apparatus according to claim 3 characterized in that a bar code reader is provided centrally at each of the two flat sides of the shallow passage.

5. Apparatus according to claim 4 characterized in that a clamping device is provided in the branching-off side section of the transport path.

6. Apparatus according to claim 5 characterized in that the clamping device has a pivot lever which can be pivoted into the side section.

7. Apparatus according to claim 6 characterized in that an undriven transport roller is provided, spring-loaded towards the pivot lever, at the side of the side section which is opposite the pivot lever.

8. Apparatus according to claim 6 characterized in that the pivot lever has a guide pin engaging into a second cam track provided on the control disk.

9. Apparatus according to claim 8 characterized in that the cam track has a region which is concentric relative to the axis of the control disk and an end region which produces the deflection movement of the pivot lever.

10. Apparatus according to claim 1 characterized in that the reading-identification means has a bar code reader and a reader for a re-writable electronic module, said thermal printing head being arranged between the bar code reader and the reader for a re-writable electronic module.

11. Apparatus according to claim 10 characterized in that a bar code reader is provided centrally at each of the two flat sides of the shallow passage.

12. Apparatus according to claim 1 characterized in that the pressure roller is mounted on a rocker member which can be raised by means of an eccentric element.

13. Apparatus according to claim characterized in that the eccentric element has an entrainment roller which is arranged on a pivotably driven crank arm and the entrainment roller engages into a slot in the rocker member.

14. Apparatus according to claim 1 further comprising at least one side section branching from the flat transport path subsequently to the reading-identification means, and a switchable routing device.

15. Apparatus according to claim 14 characterized in that the switchable routing device has a pivotably mounted routing flap which engages with a guide pin into a cam track and the cam track is provided on a rotatably driven control disk.

16. Apparatus according to claim 15 characterized in that the cam track has a region which is concentric with respect to the axis of the control disk and an eccentric end region for producing the pivotal movement of the routing flap.

17. Apparatus according to claim 1 further comprising two side sections branching from the transport path, each of the two side sections having a routing flap and a clamping device.

18. Apparatus according to claim 17 characterized in that associated with the two routing flaps and the two clamping devices is a common, rotatably driven control disk on which are provided a common cam track for the two routing flaps and a common cam track for the two pivot levers of the clamping devices.

* * * * *

UNITED STATES PATENT AND TRADEMARK OFFICE
CERTIFICATE OF CORRECTION

PATENT NO.   : 5,825,393
DATED        : October 20, 1998
INVENTOR(S)  : KOCZNAR, Wolfram et al.

It is certified that error appears in the above-indentified patent and that said Letters Patent is hereby corrected as shown below:

Column 6, line 12, claim 13: cancel beginning with "13. Apparatus according to claim characterized in that the eccentric element" to and including "slot in the rocker member." column 6, line 15 and insert the following claim:

--13. Apparatus according to claim 12 characterized in that the eccentric element has an entrainment roller which is arranged on a pivotably driven crank arm and the entrainment roller engages into a slot in the rocker member.--

Signed and Sealed this

First Day of June, 1999

Attest:

Attesting Officer

Q. TODD DICKINSON

Acting Commissioner of Patents and Trademarks